April 8, 1969     H. STRAUB     3,437,027
PHOTOGRAPHIC SHUTTER WITH AN ELECTRONIC TIMING DEVICE
Filed Oct. 26, 1966
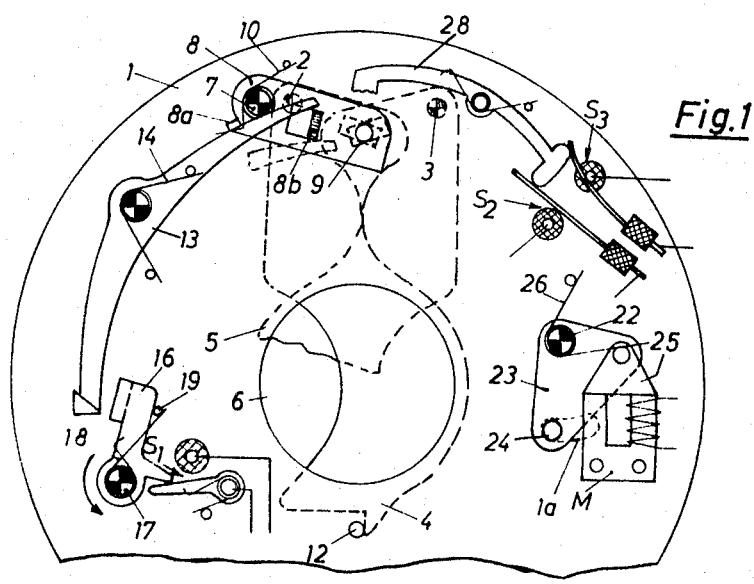
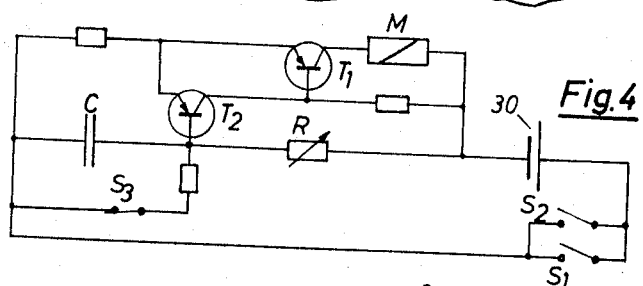
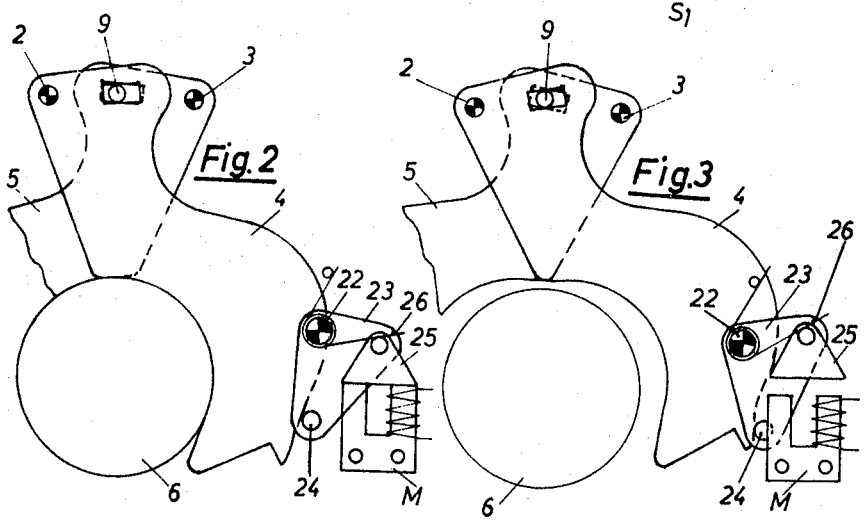
INVENTOR
Helmut Straub
By
Arthur A. March
ATTORNEY

United States Patent Office 3,437,027
Patented Apr. 8, 1969

3,437,027
PHOTOGRAPHIC SHUTTER WITH AN ELECTRONIC TIMING DEVICE
Helmut Straub, Hofen, Black Forest, Germany, assignor to Prontor-Werk Alfred Gauthier, G.m.b.H., Calmbach, Black Forest, Germany, a corporation of Germany
Filed Oct. 26, 1966, Ser. No. 589,649
Claims priority, application Germany, Oct. 30, 1965,
P 38,011
Int. Cl. G03b 9/60
U.S. Cl. 95—53.3      7 Claims

ABSTRACT OF THE DISCLOSURE

A photographic shutter with an electronic timing device is provided that has a shutter blade movable back and forth during the exposure process and a detent for holding the shutter blade in the open position for the duration of the exposure. The electronic timing device has an electromagnet engageable with the detent to hold the detent in a fixed position. A spring biases the detent into contact with the electromagnet and the detent is held by the electromagnet in position for engagement with the shutter blade during the opening motion of the shutter blade shortly before reaching the reversal point to prevent the shutter blade from continuing its motion until the release by the electromagnet.

---

This invention relates to photographic shutters with electronic timing devices and, more particularly, to a photographic shutter having at least one shutter blade mounted for back and forth movement during the exposure process, and with an electronic timing device having an electromagnet for operating a detent to hold the shutter blade in the open position for the duration of the exposure.

In previous shutter arrangements of this type, the open time detent was heretofore transferred into the locked position in cooperation with an armature coupled with the detent that was made to contact the electromagnet during the winding or releasing process. To accomplish this, special power transmission means had to be provided for the winding or releasing mechanism, to make the armature contact the electromagnet during the course of the winding or releasing motion, in order to hold the detent in the locking position after the application of a voltage. This arrangement is disadvantageous in that the transmission means, provided exclusively for the above mentioned purpose, not only requires an additional expenditure for components, but beyond this, makes it difficult to assemble the operating components of the shutter because of the very limited assembly space of the shutter housing.

It is an object of this invention to provide a shutter arrangement which guarantees, with the least possible structural expenditure, a functionally safe operating mode, whereby, the detent, due to a simple design, is applicable to both self-winding shutters and wound shutters without significant modifications.

Essentially, this problem is solved for shutters of the above mentioned type by an arrangement whereby the detent is biased into contact with the electromagnet by means of a spring, and retained in this position by the electromagnet. The shutter blade is engaged by the detent during the opening motion shortly before reaching the reversal point, in order to prevent the shutter blade from continuing in its motion until released by the electromagnet. In this manner it is possible to create the conditions under which it is feasible to do without the special power transmission means to transfer the detent into the locking position in a shutter with an electronic timing device, thus enabling the shutter to be designed with a relatively simple structure and which avoids unnecessary space consuming requirements. In addition, the omission of the power transmission means also makes it possible to achieve added freedom in the arrangement of other components.

The structural design of the detent may provide for a pivoting plate supporting a magnetic armature on one end and a strike pin on the other end thereof, positioned within the range of motion of the shutter blade. The pivoting plate may be a triangular in shape member pivotally mounted on a support at one apex and having a magnetic armature mounted at a second apex and a locking pin mounted at a third apex positioned in the range of motion of the shutter blade. Also, the plate forms two armed levers pivotally mounted on a support with a magnetic armature mounted on one of the arms of the lever and having a locking pin mounted on the other of the arms of the lever in the range of motion of the shutter blade.

Various other objects, features and advantages of this invention will be apparent from the following specification, claims and the drawing appended hereto wherein:

FIGURE 1 is a fragmentary top view of a self-winding shutter with an electronic timing device illustrated in the starting position with the open time detent in the locked position.

FIGURE 2 is a fragmentary view of the self-winding shutter of FIGURE 1 illustrating the shutter blade locked by the open time detent.

FIGURE 3 is a view similar to FIGURE 2 illustrating the shutter blades in their reversal position after release by the open time detent.

FIGURE 4 is a schematic diagram of the wiring circuit of the electronic timing device serving to control the electromagnet of the open time detent.

Referring now to the drawings, there is illustrated the photographic shutter of this invention disclosed in the form of a self-winding shutter having a base plate, designated by the reference numeral 1, which serves to receive the movable parts of the shutter mechanism and is disposed in a shutter housing in a conventional manner (not shown). Two shutter blades 4 and 5 which are movable to move back and forth by means of an actuating device to uncover a shutter opening 6 machined into the base plate 1. The shutter blades 4 and 5 are rotatably mounted on the upper side of the base plate 1, as viewed in FIGURE 1, by means of bearing pins 2 and 3 respectively.

The actuating device consists essentially of a lever 8 which is mounted on a pin 7 and operably connected with the two blades 4 and 5 by means of a pin 9. Under the influence of a closing spring 10, the shutter blade actuating lever 8 assumes the position illustrated in FIGURE 1, corresponding to the closed position of the shutter blades 4 and 5 as determined by a stop pin 12.

Operably associated with the shutter blade actuating lever 8 is a rotatably mounted two-arm driving lever 13 which, in the starting position of the shutter, rests at one end against a tab 8a of the shutter blade actuating lever 8. The other end of the driving lever 13 cooperates with an intermediary lever 16 which, in turn, is mounted in a winding shaft 17 and is biased in the contact making position against a stationary pin 19 by means of a return spring 18. The intermediary lever 16 may be turned in a counterclockwise direction, as viewed in FIGURE 1, by suitable means not illustrated in the drawings, such as by a conventional winding and releasing lever suitably mounted to rotate the winding shaft 17. In the range of motion of the intermediary lever 16 there is a switch $S_1$ which, in the starting position of the shutter as illustrated in FIGURE 1, assumes the open position and is a component of an electronic timing device which is described in greater detail hereinafter.

As may be seen from the drawing, a detent is provided for cooperation with the shutter blade system formed by the two shutter blades 4 and 5. One shutter blade engages the detent during its opening motion shortly before reaching the reversal point and is locked by the detent in this position for the duration of the exposure time. In the illustrated embodiment, a plate 23 serves as a detent, which, is pivotally mounted on a pin 22 and has attached thereto a locking pin 24 and a magnetic armature 25. An advantageous arrangement is provided with the armature 25 in the starting position of the shutter, resting against the poles of an electromagnet M controlled by the electronic timing device under the influence of a return spring 26, whereby the locking pin 24, disposed in a motion slot 1a in the base plate 1, assumes the locking position.

In the embodiment illustrated in FIGURE 1, a switching lever 28, made of nonconductive material and cooperating with two contact switches $S_2$ and $S_3$ forming a part of the electronic switching device, operably engages the drive pin 9 of the shutter blade actuating lever 8. In the starting position of the shutter, switch $S_2$ is open and switch $S_3$ is closed. The electronic switching device serves to control the electromagnet M to achieve various exposure times and can be designed in a manner known as an emitter-coupled trigger circuit having two transistors $T_1$ and $T_2$, a capacitor C and a variable resistor R. The transistor $T_1$ and the electromagnet M are in series with a current source 30 and with switches $S_1$ and $S_2$ which are parallel to each other. Switch $S_3$ and the capacitor C connected to the second transistor $T_2$ as well as to the variable resistor R are in circuit of their own.

The operating mode of the shutter arrangement described above is as follows:

In the starting position illustrated in FIGURE 1, the shutter blades 4 and 5 assume, under the influence of the closing spring 10, the closed position as determined by the pin 12. In this position, the two switches $S_1$ and $S_2$, which serve to supply the electronic switching device with current, are opened, whereas the switch $S_3$ is closed and the armature 25 is biased into engagement with magnet M and, consequently, the pin 24 assumes the locking position.

When actuating the winding and release handle of the shutter (not shown), the intermediary lever 16 turns in a counterclockwise direction as the winding shaft 17 is rotated, whereby the driving lever 13 engages the under side of a driving tab 8b of the shutter blade actuating lever 8, as illustrated in phantom line in FIGURE 1, thereby increasing the tension on driving spring 14 biasing the lever 13 in a counterclockwise direction. Simultaneously, the switch $S_1$ changes into the contact making position causing the transistor $T_1$ to be current carrying and, consequently, energizing the electromagnet M so that the detent, with the pin 24 is held in the locking position by the electromagnetic force of the electromagnet M. At this time the transistor $T_2$ remains blocked. At the termination of the winding and releasing motion, the intermediary lever 16 slides off the driving lever 13 which, in turn, transfers the shutter blades 4 and 5 to the open position by moving the shutter blade actuating lever 8 in a counterclockwise direction under the influence of the driving spring 14.

During this opening motion, the switching lever 28 turns in a clockwise direction, thereby forcing the switch $S_2$ into the contact making position, while the switch $S_3$ is opened to eliminate the short circuit of the capacitor C which then begins to charge. Upon the uncovering of the shutter opening 6 by the shutter blades 4 and 5, the shutter blade 4, as illustrated in FIGURE 2, engages the pin 24 which locks the shutter blade system and holds it in the open position prior to reaching the reversal point as long as the electromagnet M is energized.

When the voltage at the capacitor C has reached a predetermined value during the operation of the electronic switching device, the transistor $T_2$ initially blocked, becomes current carrying which again causes the originally opened transistor $T_1$ to block the current flow to the electromagnet M so that it is deenergized. The plate 23, of the detent, carrying the striking pin 24, now yields to the shutter blade 4 so that both of the shutter blades 4 and 5 can fully swing out, as illustrated in FIGURE 3, under the influence of the driving lever 13 and can then return to their starting position after the driving lever 13 is released from the driving tab 8b of the shutter blade actuating lever 8. During this process, the switch $S_2$ opens while the switch $S_3$ is again transferred to the contact making position. Simultaneously, the open time detent goes into the locking position with armature 25 making contact with the electromagnet M. During the return motion of the intermediary lever 16, the switch $S_1$ opens so that the electronic switching device is again separated from the power source.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A photographic shutter with an electronic timing device comprising: a shutter blade movable back and forth during the exposure process; detent means for holding said shutter blade in the open position for the duration of the exposure; an electronic timing device having an electromagnet engagable with said detent means to hold said detent in a fixed position; a spring for biasing said detent means into contact with said electromagnet; said detent means being held by said electromagnet in position for engagement with said shutter blade during the opening motion of said shutter blade shortly before reaching the reversal point to prevent said shutter blade from continuing its motion until the release by said electromagnet.

2. The photographic shutter of claim 1 wherein said detent means has a pivotally mounted member having a magnetic armature at one end and a locking pin at another end which is situated in the range of motion of said shutter blade.

3. A photographic shutter with an electronic timing device comprising: support means; a shutter blade movably mounted on said support means; operating means mounted on said support means and engagable with said shutter blade for moving said shutter blade into the open and closed position during the exposure process; detent means mounted on said support means and engagable with said shutter blade for holding said shutter blade in the open position for the duration of the exposure; an electronic timing device having magnetic means engagable with said detent means for holding said detent means in a position to be engaged by said shutter blade preventing said shutter blade from continuing its motion until said detent means is released by said magnetic means.

4. The photographic shutter of claim 3 wherein a plurality of shutter blades are pivotally mounted on said support means; and wherein said operating means is engageable with said plurality of shutter blades for moving said shutter blades into the open and closed position during the exposure process; and wherein said detent means is engageable with one of said shutter blades for holding said plurality of shutter blades in the open position for the duration of the exposure, said operating means being adapted to retain said plurality of blades in the open position when one of said blades is engaged by said detent means.

5. The photographic shutter of claim 3 wherein said detent means has a triangular shaped member pivotally mounted on said support means at one apex of said member and having magnetic armature mounted at a second apex and a locking pin mounted at the third apex positioned in the range of motion of said shutter blade.

6. The photographic shutter of claim 3 wherein said detent means has a two arm lever pivotally mounted on said support means with a magnetic armature mounted on one of the arms of said lever and a locking pin mounted on the other of the arms of said lever in the range of motion of said shutter blade.

7. The photographic shutter of claim 3 wherein said detent means is biased into contact with said electromagnet by spring means.

References Cited

UNITED STATES PATENTS

| | | |
|---|---|---|
| 3,208,365 | 9/1965 | Cooper. |
| 3,230,853 | 1/1966 | Durst. |
| 3,233,531 | 2/1966 | Fairbank. |

NORTON ANSHER, *Primary Examiner.*

L. H. McCORMICK, *Assistant Examiner.*

U.S. Cl. X.R.

95—53, 63